United States Patent [19]

Suzuki et al.

[11] Patent Number: 4,777,233

[45] Date of Patent: Oct. 11, 1988

[54] METHOD FOR THE PRODUCTION OF ACRYLOXY-CONTAINING ORGANOPOLYSILOXANE AND THE ACRYLOXY CYCLOHEXYL ORGANOPOLYSILOXANES

[75] Inventors: Toshio Suzuki, Kimitsu; Makoto Yoshitake, Ichihara, both of Japan

[73] Assignee: Toray Silicone Co., Ltd., Tokyo, Japan

[21] Appl. No.: 125,649

[22] Filed: Nov. 25, 1987

[30] Foreign Application Priority Data

Nov. 27, 1986 [JP] Japan ................................ 61-282908

[51] Int. Cl.$^4$ ............................................ C08G 77/20
[52] U.S. Cl. ........................................ 528/32; 528/14; 528/21; 528/26; 522/99; 522/148; 556/437; 556/440
[58] Field of Search ................. 528/32, 26, 21, 14; 556/437, 440; 522/99, 148

[56] References Cited

U.S. PATENT DOCUMENTS

| | | | |
|---|---|---|---|
| 4,293,678 | 10/1981 | Carter et al. | 522/44 |
| 4,301,268 | 11/1981 | Kropac | 525/479 |
| 4,454,295 | 6/1984 | Wittmann et al. | 528/32 |
| 4,733,942 | 3/1988 | Hida et al. | 528/32 |

*Primary Examiner*—Melvyn I. Marquis
*Attorney, Agent, or Firm*—Roger H. Borrousch

[57] ABSTRACT

A method of producing acryloxy containing organopolysiloxanes by reacting an epoxy containing organopolysiloxane with an acrylic acid or methacrylic acid followed by a reaction with acryloyl chloride or methacryloyl chloride. The novel acryloxy or methacryloxy cyclohexyl containing organopolysiloxanes are useful as compositions which cure by radiation, such as ultraviolet or electron beam. The compositions containing the acryloxy or methacryloxy cyclohexyl containing organopolysiloxanes can also contain other ingredients which are useful in radiation curable compositions, such as photoinitiators in ultraviolet radiation curable compositions.

3 Claims, No Drawings

METHOD FOR THE PRODUCTION OF ACRYLOXY-CONTAINING ORGANOPOLYSILOXANE AND THE ACRYLOXY CYCLOHEXYL ORGANOPOLYSILOXANES

BACKGROUND OF THE INVENTION

1. Field of the Invention

The present invention relates to a method for the production of an acryloxy containing organopolysiloxane, to acryloxy cyclohexyl containing organopolysiloxanes, and to compositions containing the acryloxy cylcohexyl organopolysiloxanes.

2. Prior Art

Organopolysiloxanes having the (meth)acrylic group in the molecule are known, and numerous radiation-curable compositions have been proposed which use them (in the present case, radiation curable is taken to mean curable with radiation having a wavelength of 100 to 400 nanometers, such as ultraviolet radiation), electron beams, visible radiation, infrared radiation, X-rays, and gamma-rays.

(i) For example, Japanese Patent Application Laid Open Numbers 48-47997 [47,997/73], 48-47998 [47,998/73], 48-47999 [47,999/73], and 48-48000 [48,000/73], and U.S. Pat. No. 4,293,678 issued to Carter et al disclose various methods for the production of methacryloxy group-containing organopolysiloxane compounds, as well as disclosing that such compounds are photopolymerizable. A single silicon atom is bonded to no more than one methacryloxy group-containing organic group in these methacryloxy group-containing organopolysiloxanes.

(ii) Also, U.S. Pat. No. 4,301,268 issued to Goldschmidt TH AF discloses an organopolysiloxane in which individual silicon atoms are bonded to two or more methacryloxy group-containing organic groups. Here, the methacryloxy groupcontaining organic groups are bonded to the silicon atoms via Si-O-C bonds.

(iii) Furthermore, U.S. Pat. No. 4,603,086 issued to Dainippon Printing KK and Shin-Etsu Chemical Ind discloses a method for producing organopolysiloxane in which single silicon atoms are bonded to two or more methacryloxy group-containing organic groups. In this method, a methacrylic compound is reacted by Michael addition with an amino group-containing organopolysiloxane.

PROBLEMS TO BE SOLVED BY THE INVENTION

However, various problems arise in the prior art discussed above. Thus, in the case of (i), with regard to radiation-curable compositions composed of organopolysiloxane in which individual silicon atoms are bonded to one methacryloxy group-containing organic group, curing is quite easily inhibited by oxygen, and proceeds very slowly in the presence of oxygen. In the case of (ii), in which the methacryloxy group-containing organic group is bonded to silicon via the Si-O-C bond, the Si-O- C bonds in such organopolysiloxanes tend to hydrolyze gradually, and such compositions thus lack stability. In the case of (iii), the Michael adduct between the amino group and methacrylate group, gelation gradually occurs during storage.

SUMMARY OF THE INVENTION

Accordingly, the present inventors carried out vigorous research with a view to eliminating these problems in the prior art, and achieved this invention as a result. The object of the present invention is to eliminate the above-mentioned problems by providing a novel acryloxy cyclohexyl-containing organopolysiloxane which is not subject to curing inhibition by oxygen and which does not hydrolyze or gel during standing at room temperature, as well as a method for the production of acryloxy containing organopolysiloxanes, and a radiation-curable organopolysiloxane composition which is based on said acryloxy cyclohexyl organopolysiloxane.

This invention relates to a method for the production of acryloxy-containing organopolysiloxane having in each molecule at least one unit with the general formula

$R^1{}_aR^2SiO_{(3-a)/2}$ in which $R^1$ is a monovalent organic group lacking aliphatically unsaturated bonds. $R^2$ is a group having the general formula

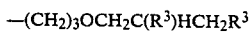

$-(CH_2)_3OCH_2C(R^3)HCH_2R^3$ or the general formula

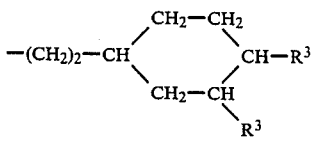

in which $R^3$ is a group with the general formula

$-OC(O)C(R^4)UCH_2$, in which $R^4$ is the hydrogen atom or methyl and a is 1 or 2, which method comprises reacting an epoxy group-containing organopolysiloxane having in each molecule at least one unit of the general formula.

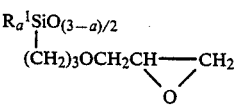

or

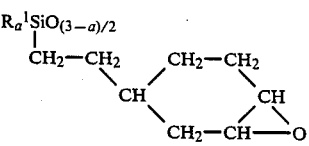

in which $R^1$ and a are defined above, is reacted with acrylic acid or methacrylic acid, followed by a reaction with acryloyl chloride or methacryloyl chloride in the presence of a hydrogen chloride acceptor.

This invention also relates to an acryloxy cyclohexyl containing organopolysiloxane having in each molecule at least one unit of the general formula

$R^1{}_aR^2SiO_{(3-a)/2}$ in which $R^1$ is a monovalent organic group lacking aliphatically unsaturated bonds, $R^2$ is a group having the general formula

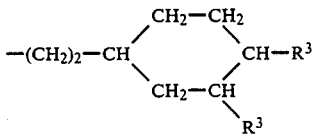

in which $R^3$ is a group with the general formula $$OC(O)C(R^4)=CH_2,$$

in which $R^4$ is the hydrogen atom or methyl and a is 1 or 2.

DESCRIPTION OF THE PREFERRED EMBODIMENTS $R^1$ in the preceding formulae, a monovalent organic group lacking aliphatically unsaturated bonds, is exemplified by alkyl groups such as methyl, ethyl, propyl, and butyl; aryl groups such as phenyl, tolyl, and naphthyl; halogenated alkyl groups such as chloromethyl and trifluoropropyl; and alkoxy groups such as methoxy, ethoxy, and propoxy. However, $R_1$ is preferably an alkyl group from the standpoint of ease of synthesis. a is 1 or 2.

The organopolysiloxane may consist of only acryloxy containing siloxane units, or may contain other siloxane units. These other siloxane units will have the general formula $$R^5{}_bSiO_{(4-b)/2}.$$

In the above formula, $R^5$ is a monovalent organic group, the hydrogen atom, or the hydroxyl group, and b is 0, 1, 2, or 3. The monovalent organic groups of $R^5$ are exemplified by alkyl groups such as methyl, ethyl, propyl, and butyl; aryl groups such as phenyl, tolyl, and naphthyl; alkenyl groups such as vinyl and allyl; halogenated alkyl groups such as chloromethyl and trifluoropropyl; and alkoxy groups such as methoxy, ethoxy, and propoxy. From the standpoint of ease of synthesis, $R^5$ is preferably alkyl. The value of b is 0, 1, 2, or 3.

The instant acryloxy cyclohexyl containing organopolysiloxane may be straight chain, branched straight chain, cyclic, or network, but straight chains, slightly branched straight chains, and cyclics are preferred. With regard to the total number of siloxane units, there is at least two, but there is preferably 10 to 2,000 from the standpoint of ease of preparation of the radiation curable organopolysiloxane composition.

Examples of acryloxy group-containing organopolysiloxane which can be produced by the method of this invention are as follows.

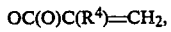

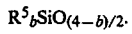

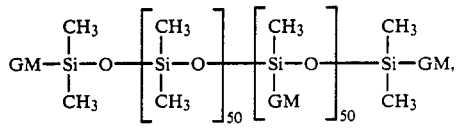

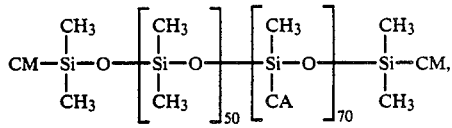

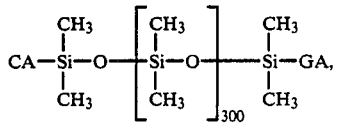

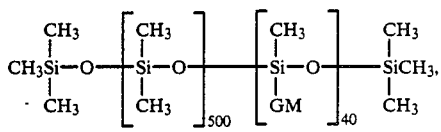

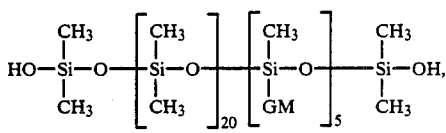

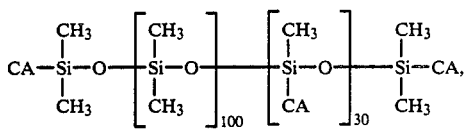

In the preceding formulae, $$GA = -(CH_2)_3-OCH_2\overset{OC(O)CH=CH_2}{\underset{|}{CH}}CH_2OC(O)CH=CH_2$$

$$GM = -(CH_2)_3-OCH_2\overset{OC(O)C(CH_3)=CH_2}{\underset{|}{CH}}CH_2OC(O)C(CH_3)=CH_2,$$

$$CA = -(CH_2)_2-CH\begin{matrix}CH_2-CH_2\\ \diagup\quad\diagdown\\ \\ \diagdown\quad\diagup\\ CH_2-CH\end{matrix}\begin{matrix}\\CH-OC(O)CH=CH_2,\\ \\ OC(O)CH=CH_2\end{matrix}$$

$$CM = -(CH_2)_2-CH\begin{matrix}CH_2-CH_2\\ \diagup\quad\diagdown\\ \\ \diagdown\quad\diagup\\ CH_2-CH\end{matrix}\begin{matrix}\\CH-OC(O)C(CH_3)=CH_2.\\ \\ OC(O)C(CH_3)=CH_2\end{matrix}$$

The acryloxy group-containing organopolysiloxanes can be produced by the method of the present invention by reacting an epoxy group-containing organopolysiloxane which has in each molecule at least one unit of the formula $$R_a{}^1SiO_{(3-a)/2}$$
$$|$$
$$(CH_2)_3OCH_2CH\underset{O}{\overset{\diagup\diagdown}{\phantom{X}}}CH_2$$

or

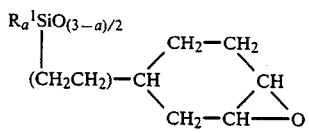

in the preceding formulae, $R^1$ is a monovalent organic group lacking aliphatically unsaturated bonds, and $a = 1$ or 2 with acrylic acid or methacrylic acid, followed by reaction with acryloyl chloride or methacryloyl chloride in the presence of a hydrochloric acid acceptor.

The epoxy group-containing organopolysiloxane starting material may consist of only the above epoxy group-containing siloxane units, or may contain other siloxane units. These other siloxane units will have the formula

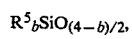

as exemplified above for the acryloxy group-containing organopolysiloxane.

The molecular configuration of these epoxy group-containing organopolysiloxanes can be, for example, straight chain, branched straight chain, cyclic, or network, but straight chains, slightly branched straight chains, and cyclics are preferred. With regard to the total number of siloxane units, this is to be at least 2, but is preferably 10 to 2,000 from the standpoint of ease of preparation of the radiation curable composition after synthesis of the acryloxy group-containing organopolysiloxane.

This epoxy group-containing organopolysiloxane is exemplified as follows.

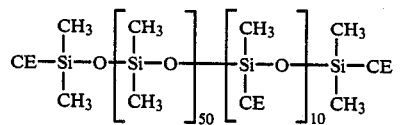

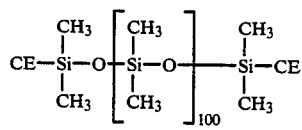

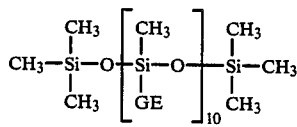

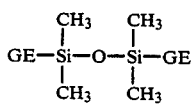

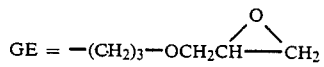

In the above formulae,

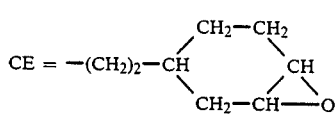

The reaction of the above-mentioned epoxy group-containing organopolysiloxane with acrylic acid or methacrylic acid is carried out using at least one mole acrylic acid or methacrylic acid per one mole epoxy groups in said organopolysiloxane. One to ten moles acrylic acid or methacrylic acid is preferably used per one mole epoxy group. The reaction temperature is 25° C. to 200° C., and preferably 60° C. to 150° C. No specific restriction is placed on the reaction time, but it is preferably 30 minutes to 100 hours.

This reaction can be conducted under ambient, reduced, or elevated pressures under an air or inert gas atmosphere. Various organic solvents can be used, for example, aromatic hydrocarbons such as benzene, toluene, or xylene; ketones such as methyl ethyl ketone or methyl isobutyl ketone; halogenated hydrocarbons such as chloroform, carbon tetrachloride, trichloroethane, or trichloroethylene; dimethylformamide; acetonitrile. The reaction may be conducted without using a catalyst, but a catalyst may be used, for example, para-toluenesulfonic acid, methanesulfonic acid, trifluoroacetic acid, morpholine, tributylamine, benzyldimethylamine, 1,4- diaza-bicyclo[2.2.2.2]octane, etc. In order to prevent reactive group gelation, a polymerization inhibitor can be used, for example, methoxyphenol, phenothiazine, hydroquinone, or tertiary- butylpyrocatechol.

Thus, an acryloxylation reaction is carried out in the first step, and the second step also consists of an acryloxylation reaction, which is carried out using acryloyl chloride or methacryloyl chloride in the presence of a hydrochloric acid acceptor.

These hydrochloric acid acceptors are exemplified by tertiary amines such as trimethylamine, triethylamine, and pyridine; secondary amines such as dimethylamine, diethylamine, and piperazine; primary amines such as butylamine and aniline; and inorganic salts such as sodium hydroxide, potassium hydroxide, and ammonia. Tertiary amines are preferred.

It is the acryloxylation reaction in the second step which characterizes the present invention, and it is this introduction of a second acryloxy or methacryloxy group in the immediate vicinity of the acryloxy or methacryloxy group introduced in the first step which generates the functional effects of no curing inhibition by oxygen and improved storage stability at room temperature.

The acryloyl chloride or methacryloyl chloride is used at one or more moles per one mole of acryloxy groups in the acryloxylated polysiloxane from the first-stage reaction. One to ten moles acryloyl chloride or methacryloyl chloride per one mole acryloxy group is preferred. The reaction temperature is 0° C. to 150° C. and preferably 0° C. to 120° C. No specific restriction is placed on the reaction time, but it is preferably 10 minutes to 10 hours. This reaction can be conducted at ambient, reduced, or elevated pressures, in an air or inert gas atmosphere, and with the use of an organic solvent. Organic solvents cited here correspond to those exemplified for the first-stage reaction.

The radiation curable organopolysiloxane composition comprises the acryloxy group-containing organopolysiloxane, produced as described above, either as such or with the addition of additives within a range which does not adversely affect their characteristics.

These other additives are exemplified by photoinitiators such as acetophenone, propiophenone, Michler's ketone, benzophenone, ethylbenzophenone, benzoquinone, paradiacetylbenzene, 1,3-diphenylacetone, xanthone, fluorenone, benzaldehyde, anthraquinone, carbazole, 3-methylacetophenone, 4-chlorobenzophenone, 4,4'-dimethoxybenzophenone, and benzfuran; polymerization initiators such as benzoyl peroxide, dicumyl peroxide, and butyl peroxide; suppressors of oxygen curing inhibition such as diethylamine, diisopropylamine, dibutylamine, diethylaminoethanol, and piperazine; polymerization inhibitors such as alkoxyphenols, catechols, hydroquinones, and phenothiazine; reactive diluents such as hexanediol acrylate and trimethylolpropane triacrylate, which are used to reduce the viscosity of the composition; organic solvents; organopolysiloxanes, fillers such as fumed or precipitated silicas; and colorants.

The radiation curable organopolysiloxane composition of the invention can be cured by exposure to ultraviolet radiation, an electron beam, visible light, infrared radiation, X-rays, or gamma-rays.

Sources of ultraviolet radiation are exemplified by xenon lamps, and low-pressure, medium-pressure, and high-pressure mercury lamps. Electron beam sources are exemplified by devices which emit a continuous curtain-like beam from a linear filament.

The radiation curable organopolysiloxane composition of the present invention can be used as an adhesive, paint, coating, or release agent for various surfaces such as glass, ceramic, metal, resins, paper, fiber, etc.

EXAMPLES

The present invention will be explained by the following illustrative examples and the present invention properly delineated by the claims. In the examples, part or parts=part or parts by weight, and %=weight percent. The properties were measured at 25° C. unless otherwise specified.

EXAMPLE 1

100 Parts epoxy group-containing polysiloxane having the average formula

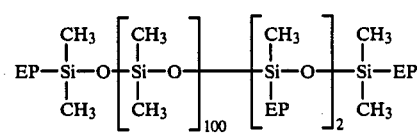

in the formula,

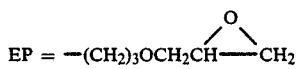

100 parts toluene, 1 part tetramethylurea, and 0.02 part phenothiazine were placed in a four-neck flask equipped with stirrer, reflux condenser, addition funnel, and thermometer. After heating to 100° C. with stirring, 5 parts acrylic acid was gradually added dropwise from the addition funnel, followed by a reaction at 100° C. for 10 hours and then distillation under vacuum to remove the toluene and unreacted acrylic acid. The product was designated as AP-1. The results of nuclear magnetic resonance analysis, gel permeation chromatography, and infrared spectral analysis confirmed that AP-1 was a polysiloxane having the formula

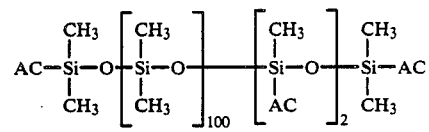

in the formula,

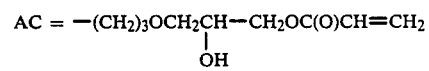

100 Parts AP-1, 100 parts toluene, and 9 parts triethylamine were placed in a four-neck flask equipped with stirrer, reflux condenser, addition funnel, and thermometer, and stirred. 8 Parts acryloyl chloride was gradually dripped in from the addition funnel while the flask was cooled with water to prevent an increase in temperature, followed by stirring at room temperature for 1 hour and then stirring at 40° C. for 1 hour in order to complete the reaction. After completion of the reaction, triethylamine hydrochloride was removed by filtration, and triethylamine, toluene, and unreacted acryloyl chloride were removed by distillation under vacuum. Using analyses as for AP-1, the obtained polysiloxane (DAP-1) was confirmed to have the following formula:

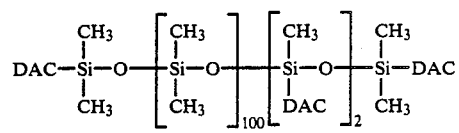

in the formula,

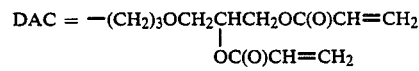

DAP-1, or AP-1 in the comparison example, was applied in a thickness of approximately 10 microns on aluminum plate, and the curability was tested using exposure to ultraviolet radiation or an electron beam. 2% 2-methyl-2-hydroxypropiophenone was added as photoinitiator in the case of ultraviolet radiation. The ultraviolet light source was a 160 W/cm medium-pressure mercury lamp, and the radiation atmosphere was the ambient. The electron beam device used the curtain beam method, with an output voltage of 165 kV and a current of 2.5 mA, and the radiation atmosphere had an oxygen concentration of 500 ppm. Curability testing involved measuring the dose required until the coat could not be destroyed by manual rubbing, and these results are reported in Table 1.

TABLE 1

| POLYSILOXANE | | ENERGY DOSE REQUIRED FOR CURING | |
|---|---|---|---|
| | | ULTRA-VIOLET RADIATION (mJ/cm2) | ELECTRON BEAM (Mrad) |
| THE INVENTION | DAP-1 | 30 | 3 |
| COMPARISON EXAMPLE | AP-1 | 55 | 12 |

EXAMPLE 2

100 Parts of the epoxy group-containing polysiloxane

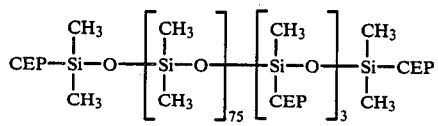

in the formula,

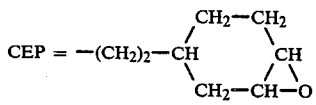

100 parts xylene, 1.5 parts tetramethylurea, and 0.02 part phenothiazine were placed in a four-neck flask equipped with stirrer, reflux condenser, addition funnel, and thermometer. After heating to 100° C. with stirring, 7.5 parts acrylic acid was gradually added dropwise from the addition funnel, followed by a reaction at 100° C. for 10 hours and then distillation under vacuum to remove the xylene and unreacted acrylic acid. The product was designated as AP-2. The results of nuclear magnetic resonance analysis, gel permeation chromatography, and infrared spectral analysis confirmed that AP-2 was a polysiloxane having the formula

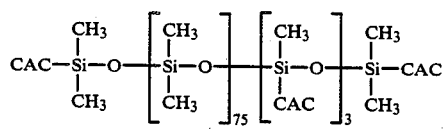

in the formula,

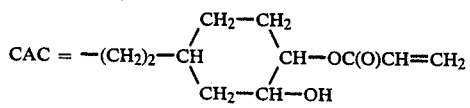

100 Parts AP-2, 100 parts toluene, and 8.6 parts pyridine were placed in a four-neck flask equipped with stirrer, reflux condenser, and addition funnel, and stirred. 10 Parts acryloyl chloride was gradually dripped in from the addition funnel while the flask was cooled with water to prevent an increase in temperature, followed by stirring at room temperature for 1 hour and then stirring at 40° C. for 1 hour in order to complete the reaction. After completion of the reaction, pyridine hydrochloride was removed by filtration, and pyridine, toluene, and unreacted acryloyl chloride were removed by distillation under vacuum. Using analyses as for AP-2, the resulting polysiloxane (DAP-2) was confirmed to have the following formula:

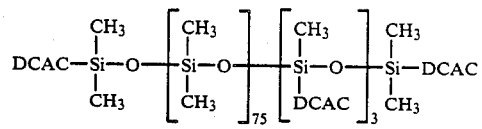

in the formula,

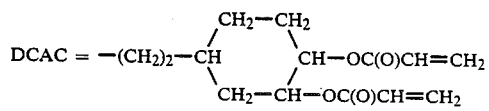

DAP-2, or AP-2 in the comparison example, was applied on aluminum plate as in Example 1, and the curability was tested using exposure to an electron beam. The radiation conditions were the same as in Example 1, except that the tests were conducted using oxygen concentrations of 200 ppm or 500 ppm.

These results are reported in Table 2.

TABLE 2

| POLYSILOXANE | | ELECTRON BEAM DOSE REQUIRED FOR CURING (Mrad) | |
|---|---|---|---|
| | | 200 ppm oxygen concentration | 500 ppm oxygen concentration |
| THE INVENTION | DAP-2 | 1.5 | 2.5 |
| COMPARISON EXAMPLE | AP-2 | 3.0 | 12 |

In addition, DAP-2 was allowed to stand in the dark at 30° C./70% RH for 3 months; however, the external appearance, viscosity, and curability did not undergo any changes.

For comparison, an organopolysiloxane having the formula

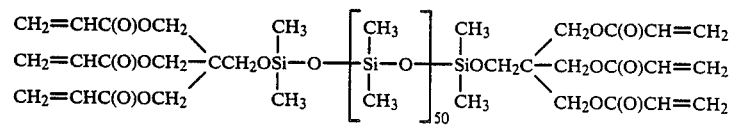

was maintained under the same conditions as above. It became opaque within 2 months, and finally converted into a nonuniform liquid.

In another comparison example, organopolysiloxane having the formula

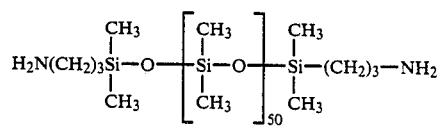

was reacted with trimethylolpropane triacrylate in a 1 : 2 ratio at 80° C. for 1 hour. The product was maintained under the same conditions as above: gelation occurred within the 3 months.

EXAMPLE 3

100 Parts epoxy group-containing polysiloxane having the formula

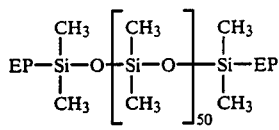

in the formula,

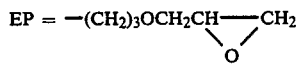

100 parts xylene, 1 part tetramethylguanidine, and 0.02 part phenothiazine were placed in a four-neck flask equipped with stirrer, reflux condenser, addition funnel, and thermometer. After heating to 110° C. with stirring, 6.4 parts methacrylic acid was gradually added dropwise from the addition funnel, followed by a reaction at 110° C. for 15 hours and then distillation under vacuum to remove the xylene and unreacted methacrylic acid. The product was designated as MP-1. The results of nuclear magnetic resonance analysis, gel permeation chromatography, and infrared spectral analysis confirmed that MP-1 was a polysiloxane having the formula

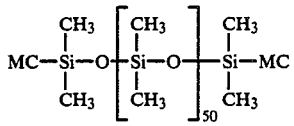

in the formula,

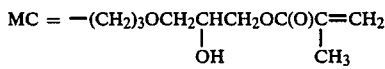

100 Parts MP-1, 150 parts xylene, and 10 parts triethylamine were placed in a four-neck flask equipped with stirrer, reflux condenser, addition funnel, and thermometer, and stirred. 9 Parts methacryloyl chloride was gradually dripped in from the addition funnel while the flask was cooled with ice to prevent an increase in temperature, followed by stirring at 50° C. for 2 hours in order to complete the reaction. After completion of the reaction, triethylamine hydrochloride was removed by filtration, and triethylamine, xylene, and unreacted methacryloyl chloride were removed by distillation under vacuum. Using analyses as for MP-1, the resulting polysiloxane (DMP-1) was confirmed to have the following formula

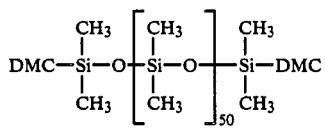

in the formula,

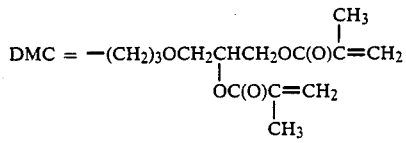

DMP-1, or MP-1 in the comparison example, was in each case combined with 3% 2-methyl-2-hydroxypropiophenone, followed by coating as in Example 1 on aluminum plate. The curability was then tested using exposure to ultraviolet radiation. The ultraviolet light source and radiation conditions were entirely identical to those of Example 1, and these results are reported in Table 3.

TABLE 3

| POLYSILOXANE | | UV ENERGY DOSE REQUIRED FOR CURING mJ/cm$^2$ |
|---|---|---|
| THE INVENTION | DMP-1 | 120 |
| COMPARISON EXAMPLE | MP-1 | <200 |

EXAMPLE 4

100 Parts epoxy group-containing polysiloxane having the formula

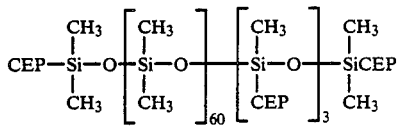

in the formula,

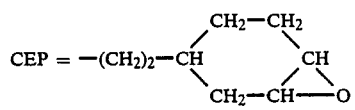

100 parts xylene, 1.5 parts tetramethylurea, and 0.02 part phenothiazine were placed in a four-neck flask equipped with stirrer, reflux condenser, addition funnel, and thermometer. After heating to 100° C. with stirring, 8.5 parts methacrylic acid was gradually added dropwise from the addition funnel, followed by a reaction at 100° C. for 10 hours and then distillation under vacuum to remove the xylene and unreacted methacrylic acid. The product was designated as MP-2. The results of nuclear magnetic resonance analysis, gel permeation chromatography, and infrared spectral analysis confirmed that MP-2 was a polysiloxane having the formula

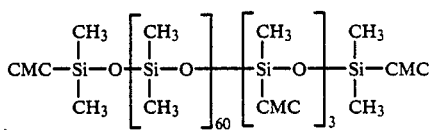

in the formula,

-continued

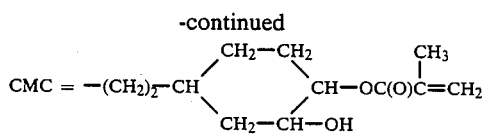

100 Parts MP-2, 100 parts toluene, and 9.8 parts pyridine were placed in a flask equipped with stirrer, reflux condenser, and addition funnel, and stirred. 12 Parts acryloyl chloride was gradually dripped in from the addition funnel while the flask was cooled with water to prevent an increase in temperature, followed by stirring at room temperature for 1 hour and then stirring at 40° C. for 1 hour in order to complete the reaction. After completion of the reaction, pyridine hydrochloride was removed by filtration, and pyridine, toluene, and unreacted acryloyl chloride were removed by distillation under vacuum. Using analyses as for MP-2, the resulting polysiloxane (DMP-2) was confirmed to have the following formula:

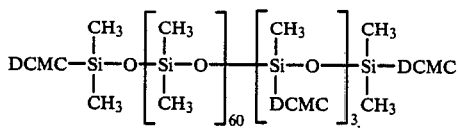

in the formula,

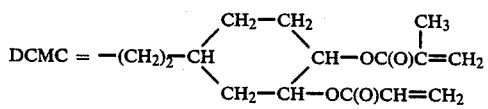

DMP-2, or MP-2 in the comparison example, was coated on aluminum plate, as in Example 1, and the curability was tested for exposure to an electron beam. The exposure conditions were the same as in Example 1, except that the tests were conducted at oxygen concentrations of 200 ppm or 500 ppm. These results are reported in Table 4.

TABLE 4

| POLYSILOXANE | | ELECTRON BEAM DOSE REQUIRED FOR CURING (Mrad) | |
|---|---|---|---|
| | | 200 ppm oxygen concentration | 500 ppm oxygen concentration |
| THE INVENTION | DMP-2 | 4.0 | 6.0 |
| COMPARISON EXAMPLE | MP-2 | 15 | >20 |

EFFECTS OF THE INVENTION

The production method of the present invention is characterized by the efficient production of the target acryloxy group-containing organopolysiloxane. It is characteristic of the radiation curable organopolysiloxane composition based on the instant acryloxy group-containing organopolysiloxane that the former's curing is not inhibited by oxygen and that the former has an excellent storage stability.

That which is claimed is:

1. A method for the production of acryloxy-containing organopolysiloxane having in each molecule at least one unit with the general formula $$R^1_a R^2 SiO_{(3-a)/2}$$

in which $R^1$ is a monovalent organic group lacking aliphatically unsaturated bonds, $R^2$ is a group having the general formula $$-(CH_2)_3OCH_2C(R^3)HCH_2R^3$$

or the general formula

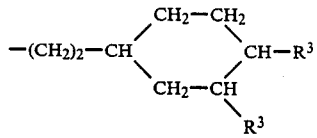

in which $R^3$ is a group with the general formula $$-OC(O)C(R^4)=CH_2,$$

in which $R^4$ is the hydrogen atom or methyl and a is 1 or 2, which method comprises reacting an epoxy group-containing organopolysiloxane having in each molecule at least one unit of the general formula

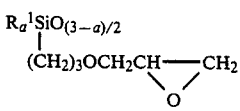

or

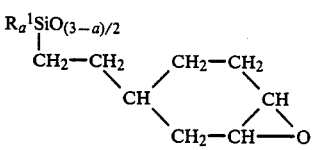

in which $R^1$ and a are defined above, is reacted with acrylic acid or methacrylic acid, followed by a reaction with acryloyl chloride or methacryloyl chloride in the presence of a hydrogen chloride acceptor.

2. A acryloxy cyclohexyl containing organopolysiloxane having in each molecule at least one unit of the general formula $$R^1_a R^2 SiO_{(3-a)/2}$$

in which $R^1$ is a monovalent organic group lacking aliphatically unsaturated bonds, $R^2$ is a group having the general formula

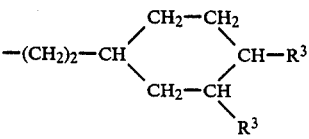

in which $R^3$ is a group with the general formula $$-OC(O)C(R^4)=CH_2,$$

in which $R^4$ is the hydrogen atom or methyl and a is 1 or 2.

3. A radiation curable organopolysiloxane composition comprising an acryloxy cyclohexyl containing organopolysiloxane having in each molecule at least one unit of the general formula $R^1{}_aR^2SiO_{(3-a)/2}$
in which $R^1$ is a monovalent organic group lacking aliphatically unsaturated bonds, $R^2$ is a group having the general formula
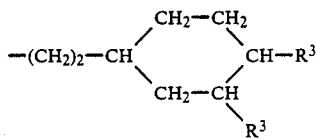
in which $R_3$ is a group with the general formula
—OC(O)C($R^4$)=CH$_2$,
in which $R^4$ is the hydrogen atom or methyl and a is 1 or 2.
* * * * *